April 22, 1947.    L. T. SACHTLEBEN    2,419,421
METHOD OF CALIBRATING LENSES WITH RESPECT
TO EFFECTIVE PHYSICAL SPEED
Filed May 30, 1944
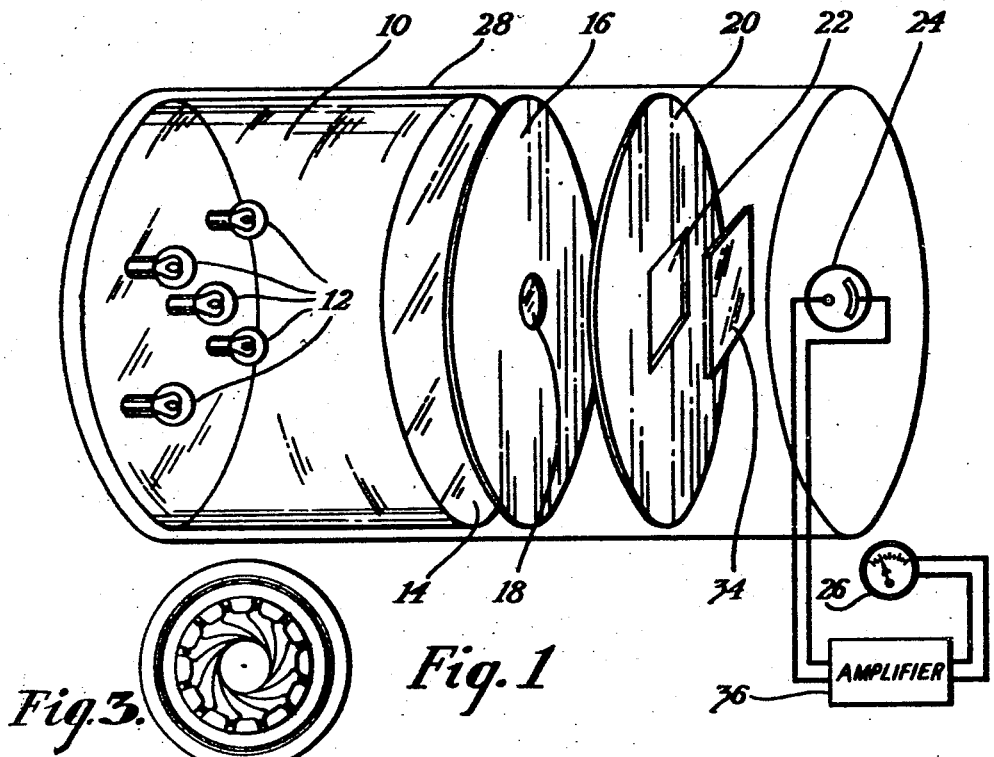
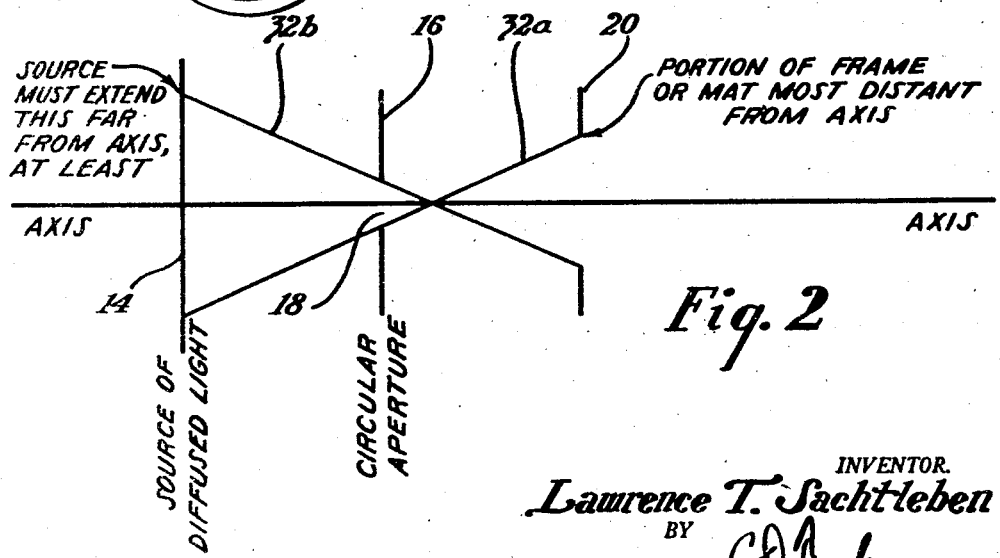
INVENTOR.
*Lawrence T. Sachtleben*
BY
ATTORNEY Patented Apr. 22, 1947

2,419,421

UNITED STATES PATENT OFFICE 2,419,421

METHOD OF CALIBRATING LENSES WITH RESPECT TO EFFECTIVE PHYSICAL SPEED

Lawrence T. Sachtleben, Indianapolis, Ind., assignor to Radio Corporation of America, a corporation of Delaware Application May 30, 1944, Serial No. 538,058

7 Claims. (Cl. 88—14)

This invention relates to the calibration of lenses and has particular reference to the provision of a primary geometrical standard of lens speed, against which the effective physical speed of a lens or plurality of lenses may be calibrated.

Since there is some confusion as to the precise meaning of lens speed, it is desirable to define that phrase for the purpose of this application as meaning the power of a lens (at a given diaphragm setting and brightness of object) to illuminate the image which it forms, this illumination being expressed in terms of light flux or energy per unit area in the plane and within the boundary of the image. When the object whose image the lens illuminates is at an infinite distance, the speed of the lens is referred to as the f/ number, this being the ratio of the focal length of the lens to its effective stop diameter.

In all optical work in which lenses are employed, it is highly desirable that the speed of a lens be determined; and in the practice of motion picture photography, in particular, it is essential that the speed of a number of lenses be calibrated with accuracy if they are all to provide (at corresponding diaphragm settings) the same true exposure at the center of the image, or integrated exposure over the area of the frame or mat which defines the limits of the useful part of the image which the lens provides. Various methods have been proposed for effectuating such calibration; thus, one method comprises rating a lens or a group of lenses as to speed against that of a standard lens, variously referred to as a "master," "given," or "reference" lens. Other methods have also been described.

It is an object of this invention to provide an improved method of calibrating lenses with ease and accuracy over a wide range of different speeds.

A further object of the invention is to provide a method for calibrating a lens as to speed, which is wholly independent of any other lens or system of lenses.

Another object of the invention is to provide a standard of lens speed which cannot deteriorate and which is stable, reliable and reproducible.

A still further object of the invention is to provide a primary geometrical standard of lens speed.

Yet another object of the invention is to provide a method by which a plurality of lenses may be calibrated so that they will all provide either the same true or the same integrated exposure at corresponding diaphragm settings.

Where the lens to be calibrated is a simple, thin lens (such as a spectacle lens), and is assumed to transmit perfectly in the useful part of the spectrum, the f/ number before referred to is the focal length of the lens divided by its free diameter. If a microscopic observer were situated in the principal focal plane of such a lens (that is, in the image of a uniformly illuminated and infinitely extended distant object formed by the lens), he would see the lens as a disk of uniform brightness. This brightness would be equal to that of the object and independent of object distance, whether at infinity or very near the lens.

If the lens is now replaced by an opaque sheet having a circular aperture of the same diameter as the effective or free diameter of the lens, and in the same location as the lens, the microscopic observer situated at any point within the boundary of the image will not be able to detect any change in the brightness, shape or size of the disk which he sees, whether that disk is, in fact, the lens or the aperture which replaced it.

Two circular sources viewed from axial points such that they appear to have identical sizes, shapes and brightnesses will deliver the same illumination to those respective points. This is in accord with the well-known theory of illumination at a point on the axis of a circular source of light, which shows that the illumination E at such a point is a function of only two factors, namely, the brightness B of the source and the angular or apparent diameter of the source as measured from the point in question. This is stated mathematically as $E = \pi B \sin^2 \theta$, where $\theta$ is the angle subtended at the point by the radius of the circular source. The expression for illumination at a point on the axis of an aplanatic (corrected) lens system is of the same form, being $E' = \pi B \sin^2 \theta'$.

Thus, except for reflections and absorption within the lens, illumination at a point is independent of whether light from a source of brightness B converges to the point in a cone of apical angle $2\theta$ through a lens, or directly from the source without intervention of the lens. See, for example, "Principles of Optics," first edition, by Hardy and Perrin, at pages 410 to 415. The same principles apply to extra-axial points.

The illumination on the axis of a circular aperture may, therefore, be used as a measure of the effective speed of a lens (when a common source of illumination is used), because the angular or apparent diameter of the circular aperture is measurable by the ratio of its distance from the point at which illumination measurement is made, to the aperture diameter. This ratio is half the cotangent of the angle included between a ray from the periphery of the aperture to the point, and the axis. Analogously, in the case of an actual lens the f/ number is defined as the ratio of the focal length of the lens to its effective stop diameter (in the plane of the second principal point of the lens), and this ratio is also half the cotangent of the angle, in the image space, between the marginal ray from the edge of the aperture to the principal focal point, and the axis.

With the foregoing considerations in mind, a lens-calibrating device may be constructed. The device includes an extended source of uniform brightness and a thin opaque sheet with a circular aperture or "stop" which may be in contact with the source of brightness or very near to it. The speed or f/ number of such a circular stop is the ratio of its distance from the plane in which the illumination is to be measured to its diameter. It will be seen that such a device provides a geometrical standard of reference for lens speed which is completely unvarying and certainly reproducible, and which is quite independent of any lens.

The source of light must be of uniform brightness, and large in relation to the diameter of the aperture, so that every portion of the latter will be uniformly illuminated. The shorter the focal length of the lens to be calibrated, the larger must the source of light be in relation to the aperture, so that it will be intercepted by the extension of a line of sight drawn from the extreme corner of the illuminated area in the focal plane to the circumference of the aperture, and intersecting the optical axis at a point between them. The source of light should be unvarying in brightness up to obliquities so defined.

If the rating is to be made on the basis of light delivered to the center of the image (which will be on the optical axis of the system) or to a small area near that center, then the calibration will be independent of the dimensions of the standard; but if the light delivered to a considerable surface area (which may, for example, be defined by a frame or mat, as in motion pictures or other photographic practice) is to be considered, then the distance from the aperture to the plane of the frame or area to be illuminated may be equal to the focal length of the lens to be calibrated although other distances can obviously be used depending upon the particular f/ number of the standard which it is desired to utilize. Where it is desired to calibrate a number of lenses so that they will all have the same integrated exposure over the entire area of the frame or mat for a given numerical speed, the distance from the aperture to the plane of the frame or mat defining the illuminated area should be equal to the focal length of the lens in most general use.

In the accompanying drawing,

Figure 1 is a view, partly in perspective and partly diagrammatic, of a device which may be employed for carrying the invention into effect, Figure 2 is a diagram which illustrates the size of the source of light in relation to the other elements of the system, and Figure 3 is a front view of a lens with an adjustable diaphragm.

The device will be described in connection with the calibration of a plurality of lenses by reference to a hypothetical lens which has, for example, a focal length of two inches and a true geometrical speed of f/3.

The device comprises a housing 10 containing a source of light, such as the lamps 12. The front wall 14 of the housing is of ground or opal glass, so that together with the lamps it constitutes a uniform and nearly perfectly diffused source of light. About an inch in front of the wall 14 is a thin opaque sheet 16 having a circular aperture 18 therein. This aperture has a diameter equal to the focal length of the hypothetical lens to be used as a reference divided by the numerical speed or f/ number, in this case 0.666 inch. At a distance of two inches from the aperture there is a frame or mat 20 defining an area 22 which is, therefore, in the focal plane of the hypothetical reference lens. The source of diffuse illumination, the aperture 18 and the illuminated area 22 are all located on a common optical axis. As previously mentioned, the source of diffused light constituted by the ground glass wall 14 must be of sufficient size to be included within the bounds of lines of sight 32a and 32b (Figure 2) drawn from the corners of the illuminated area 22 through the optical axis to the circumference of the aperture 18. With the dimensions before given, the wall 14 should be from 4 inches to 6 inches across.

The light delivered to the illuminated area may be measured by any suitable means, as, for example, by an integrating sphere, or by a photocell 24 equipped with a diffusing screen 34 and connected to a microammeter 26. It will usually be necessary to amplify the output of the photocell, as by means of the amplifier 36, before satisfactory readings can be taken on the meter. The diffusing screen 34 may be bounded by the frame or mat 20, or may be situated between the frame and the photocell, it being necessary only that it shall be of sufficient size to intercept all light passing through the area 22.

The brightness of the source of diffused light should be held constant during the whole of the process, and any suitable means may be employed for this purpose.

The whole assembly is contained within a mounting tube 28. It is desirable to take special precautions to prevent reflection of light from any element of the assembly to the source of light and back from there to the area 22. Treatment of all optical surfaces in any suitable manner to reduce reflection from such surfaces to a minimum will help in this connection; and, in addition, all mechanical parts should be finished dead black.

After the light delivered to the area 22 has been measured, the sheet 16 may be removed and replaced by any lens, such as the lens and diaphragm illustrated in Figure 3, so that its principal focal point or any desired conjugate focal point of the lens is in the plane of the area 22. The diaphragm of the lens is adjusted until the same amount of light as before is delivered to the area 22. At that adjustment, the lens has a numerical speed equal to the diameter of the aperture divided into the distance from the aperture to the frame, and the diaphragm may be so marked at that adjustment. It is usual to calibrate the diaphragm adjusting ring in such manner that a change from one calibrated position to either adjacent one doubles or halves the light transmitted by the lens. One adjacent point may be calibrated according to this customary scheme by opening the diaphragm until the light delivered to the area 22 is just double that for the previously marked adjustment whose numerical speed was calculated as just described. This new adjustment for doubled light is then marked and assigned a numerical speed equal to that of the previous or reference adjustment divided by the square root of 2. This is in accordance with the theory that the points on the f/ number scale are inversely proportional to the square root of the corresponding light transmissions of the lens system. Likewise, the remaining adjacent point may be calibrated according to the customary scheme by closing the diaphragm until the light delivered to the area 22 is just half that for the originally marked adjustment whose speed was calculated in terms of the aperture diameter and distance from aperture to frame. The new adjustment for halved light is then marked and assigned a numerical speed equal to that of the reference adjustment multiplied by the square root of 2. Thus other points on the diaphragm may be calibrated by repeatedly doubling or halving the amount of light delivered to the area 22, by adjusting the lens diaphragm and by respectively and also repeatedly dividing or multiplying the value of f/ number taken as the starting point by the square root of 2.

An alternative method, according to the present invention, by means of which a series of f numbers may be calibrated for a given lens is to place the aperture at different distances along the axis between the light source and the screen and with the lens at a fixed position repeat the adjusting and measuring steps outlined above. For each succeeding position of the aperture the corresponding f number of the lens may be found by adjusting the diaphragm until the amount of light passing through it to the chosen area of the screen is the same as that which passed through the aperture to the same area.

The sheet 16 may be provided with means for adjusting it both with respect to its spacing in the mounting tube 28 in relation to the glass wall 14 and the area 22, and also with respect to the size of the aperture 18.

It is desirable to draw attention here to certain differences between the calibrating method here proposed and the methods of the prior art.

1. The present method establishes an absolute standard of lens speed or illuminating power which is completely independent of any lens or system of lenses.

2. It is not necessary to have apertures of different diameter for lenses of different focal length where the light delivered to the axis (center of the image) alone is taken into account in calibration.

3. The f/number of the geometrical standard may be varied at will, merely by changing the distance from the aperture to the frame or mat; doubling the distance, for example, doubles the f/number.

4. Because of the use of diffused light, all points within the area of the frame or mat, as well as the light-measuring means are illuminated at substantially the same convergence, whether the standard aperture or the lens being calibrated is in place. It is not, therefore, necessary to limit the matching point to f/11 or f/16, as required by a previous method, even though no expensive integrating sphere is used.

5. The present method permits calibration on the basis of light delivered either to the center of the image, or to the entire area of the frame or mat at one time, while one of the previous methods does not permit calibration over an extended image except point by point on the basis of light delivered only to a quite limited axial or extra-axial area at one time.

There has thus been described a method which establishes a primary geometrical standard against which the speed of lenses may be calibrated. No lenses other than those to be calibrated are employed, and the standard thus established has the advantage over physical standards that it cannot deteriorate and is stable, reliable and reproducible. The method proposed is simple, accurate and flexible in operation. While the method taught is primarily applicable to white light, modifications of it may be employed for colored light and for radiations beyond the visible spectrum.

I claim as my invention:

1. The method of calibrating a lens having an adjustable diaphragm with respect to its effective physical speed, which includes the steps of (1) establishing a primary geometrical standard of lens speed by measuring the light transmitted from a source of diffuse illumination of constant uniform brightness through a wholly illuminated circular aperture in an opaque sheet adjacent to said source to an area in a plane parallel to the plane of said aperture and on a common optical axis with said source and said aperture, and (2) calibrating said lens by substituting said lens for said sheet in a position such that said area is in a focal plane of said lens, adjusting said diaphragm which also has its opening entirely illuminated until the light transmitted through said lens to said area is equal to the light transmitted through said aperture to said area, indicating said adjusted position on said diaphragm, and computing and recording the numerical speed of said lens at said adjustment as the ratio of the distance between said aperture and said area along said axis to the diameter of said aperture.

2. The method of calibrating a lens having an adjustable diaphragm with respect to its effective physical speed, which includes the steps of measuring the light transmitted from a source of diffuse illumination of constant uniform brightness through a wholly illuminated circular aperture in an opaque sheet adjacent to said source to an area in a plane parallel to the plane of said aperture and on a common optical axis with said source and said aperture, substituting said lens for said sheet in a position such that said area is in a focal plane of said lens, adjusting said diaphragm which also has its opening entirely illuminated until the light transmitted through said lens to said area is equal to the light transmitted to said area through said aperture, indicating said adjusted position on said diaphragm, computing and recording the numerical speed of said lens at said adjustment as the ratio of the distance between said aperture and said area along said axis to the diameter of said aperture, and repeating the foregoing steps with varying distances from said aperture to said area along said axis the position of said lens remaining unchanged.

3. The method of determining the proper adjustment of the diaphragm of a lens of predetermined focal length for a given effective numerical lens speed, by the aid of (1) a source of diffuse illumination of constant uniform brightness, (2) an opaque sheet adjacent to said source and having a circular aperture therein of a diameter equal to the focal length of said lens divided by said speed, and (3) a frame defining an area in a plane parallel to the plane of said aperture, on a common optical axis with said source and said aperture, said method including the following steps: (a) transmitting light from said source through said aperture to said area such that said aperture is wholly illuminated, (b) measuring the light so transmitted, (c) substituting said lens for said sheet in a position such that said area is in a focal plane of said lens, (d) adjusting said diaphragm which also has its opening entirely illuminated until the light transmitted through said lens to said area is equal to the light transmitted through said aperture to said area, and (e) marking said adjusted position on said diaphragm and recording said adjustment as the adjustment at which said lens has said speed.

4. The method of setting a plurality of lenses, each having an adjustable diaphragm, to produce the same integrated exposure at a given numerical speed by the aid of (1) a source of diffuse illumination of constant uniform brightness, (2) an opaque sheet adjacent to said source and having a circular aperture therein of a diameter equal to the focal length of one of the lenses divided by said speed, and (3) a frame defining an area in a plane parallel to the plane of said aperture, on a common optical axis with said source and said aperture, including the following steps: (a) transmitting light from said source through said aperture to said area such that said aperture is wholly illuminated, (b) measuring the light so transmitted, (c) substituting each of said lenses in turn for said sheet, each lens being placed in a position such that said area is in a focal plane of said lens under calibration, (d) adjusting the wholly illuminated diaphragm opening of each of said lenses in turn until the light transmitted through each of said lenses to said area is equal to the light transmitted through said aperture to said area, and (e) marking said adjusted position on each of said diaphragms and recording said adjustment as the adjustment at which each of said lenses produces the same integrated exposure at said speed.

5. The method of calibrating a lens having an adjustable diaphragm with respect to its effective physical speed, which includes the steps of measuring the light transmitted from a source of diffuse illumination of constant uniform brightness through a wholly illuminated circular aperture in an opaque sheet adjacent to said source to an area in a plane parallel to the plane of said aperture and on a common optical axis with said source and said aperture, so placing said lens in substitution for said sheet that said area is in a principal focal plane of said lens, adjusting said diaphragm which also has its opening entirely illuminated until the light transmitted through said lens to said area is equal to the light transmitted to said area through said aperture, marking the adjusted position on said diaphragm and computing and recording the numerical speed of said lens at said adjustment as the ratio of the distance between said aperture and said area along said axis to the diameter of said aperture.

6. The method of calibrating a lens having an adjustable diaphragm with respect to its effective physical speed, which includes the steps of measuring the light transmitted from a source of diffuse illumination of constant uniform brightness through a wholly illuminated circular aperture in an opaque sheet adjacent to said source to an area in a plane parallel to the plane of said aperture and on a common optical axis with said source and said aperture, so placing said lens in substitution for said sheet that said area is in a conjugate focal plane of said lens, adjusting said diaphragm which also has its opening entirely illuminated until the light transmitted through said lens to said area is equal to the light transmitted to said area through said aperture, marking the adjusted position on said diaphragm and computing and recording the numerical speed of said lens at said adjustment as the ratio of the distance between said aperture and said area along said axis to the diameter of said aperture.

7. The method of calibrating a lens having an adjustable diaphragm with respect to its effective physical speed, said lens being intended for use in a situation in which the image is formed in a certain predetermined plane, said method including the steps of transmitting light from a source of diffuse illumination of constant and uniform brightness through a circular aperture in an opaque member to an illuminable area in a manner such that the aperture is wholly illuminated, with the centers of said source, said aperture, and said area on a common optical axis and the planes of said source, said aperture, and said area each normal to said axis, obtaining an indication of the amount of light so transmitted to said area, measuring the ratio of the distance between said aperture and said area along said axis to the diameter of said aperture, removing said member, interposing said lens between said source and said area with the axis of said lens on said optical axis, the lens being positioned so as to cause said area to be spaced therefrom a distance equal to the distance at which the image is formed when the lens is used as intended, adjusting said diaphragm until the amount of light transmitted from said source to said area through said lens is equal to the amount of light transmitted from said source through said aperture to said area, marking said adjusted position on said diaphragm, and recording said ratio as the effective physical speed of said lens at said diaphragm adjustment.

LAWRENCE T. SACHTLEBEN.

REFERENCES CITED

The following references are of record in the file of this patent:

UNITED STATES PATENTS

| Number | Name | Date |
|---|---|---|
| 2,334,906 | Clark et al. | Nov. 23, 1943 |

OTHER REFERENCES

"Stop Calibration of Photographic Objectives" by E. W. Silvertooth, an article in Journal of the Society of Motion Picture Engineers for August 1942; pages 119 to 122 cited. (Copy in Div. 7, U. S. Patent Office.)

Ex parte Shaw, 1890 C. D. 31.